United States Patent [19]
Porter et al.

[11] Patent Number: 6,132,696
[45] Date of Patent: *Oct. 17, 2000

[54] MANUFACTURE OF PRECIPITATED CALCIUM CARBONATE OF IMPROVED COLOR AND STABLE CRYSTALLINE FORM

[75] Inventors: Alvin Lee Porter, St. John; William Joseph Wilson, Saint John, both of Canada

[73] Assignee: Goldcorp Inc., Toronto, Canada

[*] Notice: This patent is subject to a terminal disclaimer.

[21] Appl. No.: 09/092,493

[22] Filed: Jun. 5, 1998

Related U.S. Application Data

[60] Provisional application No. 60/079,827, Mar. 30, 1998.

[30] Foreign Application Priority Data

Jun. 18, 1997 [CA] Canada ................................. 2208150

[51] Int. Cl.$^7$ .................................................. C01F 11/18
[52] U.S. Cl. ..................... 423/414; 423/419.1; 423/430; 423/431; 423/155; 423/158; 423/160; 423/161; 423/165
[58] Field of Search ................... 423/155, 158, 423/160, 161, 165, 432, 431, 430, 419.1, 414; 106/461, 463, 464, 465

[56] References Cited

U.S. PATENT DOCUMENTS

| | | |
|---|---|---|
| 1,994,271 | 3/1935 | Church et al. . |
| 2,520,850 | 8/1950 | Minnick . |
| 3,347,624 | 10/1967 | Taylor ..................... 423/432 |
| 4,239,736 | 12/1980 | Fenske . |
| 4,871,519 | 10/1989 | Zikmund et al. . |
| 4,900,533 | 2/1990 | Malden . |
| 5,232,678 | 8/1993 | Bleakley et al. ..................... 423/432 |
| 5,558,850 | 9/1996 | Bleakley et al. ..................... 423/432 |
| 5,939,036 | 8/1999 | Porter et al. ..................... 423/165 |

FOREIGN PATENT DOCUMENTS

| | | |
|---|---|---|
| 352149 | 8/1935 | Canada . |
| 441583 | 5/1947 | Canada . |
| 2066655 | 7/1990 | Canada . |
| 2087949 | 7/1990 | Canada . |
| 2090088 | 2/1992 | Canada . |
| 1-301511 | 3/1989 | Japan ..................... 423/432 |
| 64-72916 | 12/1989 | Japan ..................... 423/432 |

OTHER PUBLICATIONS

Maciejewski, Marek; Oswald, Hans–Rudolf; Reller, A., *Thermal Transformations of Vaterite and Calcite*, Thermochim. Acta (1994), pp. 315–328.

*Primary Examiner*—Steven P. Griffin
*Assistant Examiner*—Eileen E. Nave
*Attorney, Agent, or Firm*—Ohlandt, Greeley, Ruggiero & Perle, L.L.P.

[57] ABSTRACT

A method for the manufacture of precipitated calcium carbonate from impure calcium oxide of improved color is disclosed. The method comprises admixing impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid. The solution obtained is treated with a reducing agent e.g. sodium hydrosulphite, separated from insoluble matter and then treated with carbon dioxide or the carbonate of the amine or alkanolamine at a temperature of at least 50° C. Preferably, the amine of the salt and of the carbonate are the same, and the salt is used in at least the stoichiometric amount to dissolve the lime.

32 Claims, No Drawings

MANUFACTURE OF PRECIPITATED CALCIUM CARBONATE OF IMPROVED COLOR AND STABLE CRYSTALLINE FORM

This application claims the benefit of U.S. Provisional Application No. 60/079,827, filed Mar. 30, 1998.

The present invention relates to a method for the manufacture of precipitated calcium carbonate (PCC) from lime using ethanolamine or an organic amine and precipitation of calcium carbonate with $CO_2$ at a temperature of at least 50° C. In particular, the method provides a precipitated calcium carbonate with a high brightness and, in embodiments, the manufacture of precipitated calcium carbonate in a stable crystalline form that resembles vaterite.

Precipitated calcium carbonate is used in a wide variety of end uses. In some end uses, the brightness of the precipitated calcium carbonate is of minor importance. However, in a number of end uses e.g. use of precipitated calcium carbonate as a filler, as a coating agent or as a pigment, it is important or critical that the precipitated calcium carbonate have a high degree of brightness. As used herein, brightness of calcium carbonate is measured by the method of TAPPI T646 om-94. Use of precipitated calcium carbonate as a filler, coating agent or pigment frequently requires that the brightness be not less than 95%.

A number of techniques may be used to obtain precipitated calcium carbonate. A typical method involves forming a suspension of lime in water, converting the lime into calcium hydroxide, and treating the resultant suspension of calcium hydroxide with carbon dioxide so as to form calcium carbonate. Such treatment leaves grit, colored material and other insoluble matter in the suspension, which contaminates the resulting PCC that is formed. Thus, in order to obtain PCC with acceptable properties, the lime used in the process must be of a high purity.

Canadian application No. 2 203 210 of W. J. Wilson and A. L. Porter, filed Apr. 21, 1997, discloses admixing impure calcium oxide with an aqueous solution of a salt of an organic amine or alkanolamine with hydrochloric or nitric acid, separating the resultant solution, forming calcium carbonate with $CO_2$ and recovering PCC. Such a method overcomes problems associated with dissolution of lime with ammonium nitrate or ammonium chloride. In the latter, if carbon dioxide and air is used to precipitate the calcium carbonate, then a significant part of the cost of the process is the capital and operating cost of the scrubbing of ammonia from the exit gas, which is a mixture of ammonia, carbon dioxide and air.

The conventional processes for preparing PCC by carbonation of lime slurries results in the formation of rhombohedral, scalenohedral and aragonite crystalline forms. Vaterite is not produced in conventional processes. There appears to have been no attempt to use PCC in the form of vaterite in, for instance, paper-making processes, because of the methods of production of PCC and the conversion of this crystalline form to rhombohedral, or scalenohedral, crystalline forms in aqueous solution. A stable form of vaterite would offer alternate uses and properties of PCC.

U.S. Pat. No. 4,900,533 of P. J. Malden discloses slaking calcium oxide in water, cooling the suspension to 45° C. or lower, and then carbonating the suspension in water with carbon dioxide in the presence of a dithionite bleaching agent.

Methods for the manufacture of precipitated calcium carbonate using an organic amine or alkanolamine of improved brightness and, in embodiments, to the manufacture of precipitated calcium carbonate in a spherical calcite crystalline form resembling vaterite have now been found.

Accordingly, an aspect of the present invention provides for a method for the manufacture of precipitated calcium carbonate from impure calcium oxide, comprising:

(a) admixing said impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid;

(b) separating the solution so obtained from insoluble matter therein; and (c) treating the solution at a temperature of at least 50° C. with (i) carbon dioxide or (ii) the carbonate of said amine or alkanolamine of step (a), said process-additionally comprising the step of adding a solution of a reducing agent subsequent to step (a).

In a preferred embodiment of the method of the present invention, the reducing agent is sodium sulphite or especially sodium hydrosulphite.

In a further embodiment, the salt of the amine or alkanolamine is added in step (a) in at least the stoichiometric amount to dissolve the lime.

In another embodiment, the reducing agent is added in an amount effective to reduce the colour of the solution of (a), such addition being before or after filtration.

In a further embodiment, the reducing agent is sodium hydrosulphite, which is added in an amount to effect a reduction in colour of the solution subjected to separation in step (b) and an improvement in the brightness of the PCC obtained in step (c). In embodiments, the sodium hydrosulphite is added to the aqueous solution in step (a) prior to admixing of the impure calcium oxide.

In a still further embodiment, the ratio of the salt of organic amine or alkanolamine to water, on a weight basis, is in the range of 1:1 to 1:3.

In yet another embodiment, the temperature of the solutions is in the range of 50–80° C., especially 50–75° C.

In another embodiment, the solution of (a) is additionally treated for separation of insoluble matter therein prior to step (b).

In yet another embodiment, the method of the present invention provides precipitated calcium carbonate having a brightness of at least 95%, and especially at least 97%.

In another preferred embodiment of the present invention, the solution is admixed subsequent to step (b) with a solution of sodium hydrosulphite in an amount in excess of the amount required to reduce the colour.

In a still further embodiment, the ratio of the salt of organic amine or alkanolamine to water, on a weight basis, is in the range of 1:1 to 1:4.

In another aspect, the present invention provides a spherical calcite which is stable when heated in water at 80° C. for one hour.

In still another aspect, the present invention provides a method of forming precipitated calcium carbonate by carbonation of slaked lime at 50–100° C. in the presence of 1–5% by weight, based on the weight of calcium carbonate, of sodium hydrosulphite.

In a further aspect, the present invention provides a method of forming precipitated calcium carbonate by carbonation of slaked lime at a temperature of at least 80° C. in the absence of excess sodium hydrosulphite.

In a still further aspect, the present invention provides precipitated calcium carbonate that is resistant to transformation to rhombohedral calcite or to aragonite.

The method of the present invention relates to the manufacture of precipitated calcium carbonate from impure lime. Sources of impure lime are known and may be obtained from the calcination of limestone in an industrial kiln. Sources of limestone suitable for a calcination process are known to persons skilled in the art. Calcination of the limestone may be carried out at temperatures in the range of from about 950° C. to about 1100° C., especially in the range of from about 950° C. to about 1050° C.

It is understood that the limestone would be contaminated with magnesium carbonate and that other materials may also be present, some of which might be colored. Examples of the latter could include iron oxide, manganese oxide, iron carbonate, manganese carbonate, sand and other silicates. Magnesium is not solubilized in the process of the present invention if the temperature of calcination is above 900° C. Nonetheless, it is understood that any suitable source of lime may be used for the process.

The method of the invention is a combination of two steps: (a) admixing with the amine as described herein, and (b) subsequently treating the resultant solution with the reducing agent e.g. for bleaching or with respect to crystal formation.

In the first step, the lime is slaked by admixing with a reagent solution in an aqueous solution in which the calcium will dissolve. The reagent solution is an aqueous solution of a salt of at least one compound selected from the group consisting of compound of the formula $RNH_2$ and alkanolamines of the formula $NH_2(R^1OH)$, where R and $R^1$ are alkyl groups of 1–4 carbon atoms. Such amines are primary amines and the alkanolamines only have one —OH moiety. The preferred alkyl groups are methyl and ethyl. The compound is in the form of a salt with hydrochloric acid or nitric acid.

In order to increase the concentration of PCC ultimately obtained in the method, and thereby reduce the amount of aqueous solution that must be handled during operation of the method, it is preferred to increase the concentration of the salt of the organic amine or alkanolamine in the solution used to treat the lime i.e. in step (a) of the method described above. However, it is found, as least in some embodiments of lime that may be used in the process, that there is a tendency for the formation of colour in the solution of step (a), especially as the concentration is increased. Moreover, the colour may develop over a period of time e.g. several days.

The formation of such colour is detrimental to the brightness of the PCC that is ultimately obtained. As an example, if ethanolamine hydrochloride is used as the amine, then with some sources of lime, colour may be formed as the concentration of ethanolamine hydrochloride is increased above 1 part ethanolamine hydrochloride to less than 3 parts of water. The colour of the solution obtained is typically brown in nature, and may be intense.

In the method of the present invention, the solution of (a) is treated with a reducing agent. In particular, the solution is treated with a reducing agent that does not result in precipitation of a calcium compound in any significant amount. The amount of reducing agent may be varied, and is used in an amount effective to reduce the colour of the solution of (a). In one embodiment, the reducing agent is present in the aqueous solution of (a) prior to addition of the impure calcium oxide, which tends to prevent formation of colour, especially brown colour or added subsequently but prior to filtration. However, it is preferred that the bleaching agent be added after the filtration described below.

Examples of the reducing agent include sodium hydrosulphite, also known as sodium dithionite ($Na_2S_2O_4$), and sodium sulphite. Sodium hydrosulphite is preferred, and the invention will generally be described herein with reference to use of sodium hydrosulphite.

The solution of (a) is filtered so as to remove impurities such as grit and other contaminants that have not dissolved in the solution. The solution may be filtered prior to addition of the reducing agent and/or after such addition. In the preferred embodiment, the solution is filtered prior to addition of the reducing agent.

In one embodiment of the method of the present invention, the solution of lime is treated with sodium hydrosulphite prior to precipitation of calcium carbonate. However, it is also exemplified that the sodium hydrosulphite may be added after precipitation. Sodium hydrosulphite is added in an amount such that there is excess sodium hydrosulphite present in the solution. In particular, the amount should be such that sodium hydrosulphite is present on the crystals of PCC subsequently separated from the solution, the crystals generally being wet or in solution and the sodium hydrosulphite being present in solution. Preferably, sodium hydrosulphite is added in an amount of 1–5% by weight, based on the weight of the PCC obtained. The resultant crystals resemble vaterite and are stable. The crystals are understood to be a spherical calcite. Alternatively, sodium sulphite may be used.

In the event that sodium hydrosulphite is added to clarify e.g. remove brown colour, in solutions of impure lime, sufficient sodium hydrosulphite may be added to provide the required excess on the crystals of PCC that are obtained. Alternatively, a second addition of sodium hydrosulphite could be made to provide the required excess on the crystals. The latter is preferred to ensure the presence of an excess i.e. presence of sodium hydrosulphite in the solution at the time of carbonation. Addition of sodium hydrosulphite after precipitation will not result in the formation of the stable form of vaterite.

The filtered solution is then reacted in one of two ways viz a) with carbon dioxide or b) with an amine carbonate. In preferred embodiments, the amine of the amine carbonate is the same as the amine in the aqueous solution used to solubilize the lime. This results in precipitation of calcium carbonate which, after filtration, leaves a mother liquor that is suitable for reuse. Use of carbon dioxide gas is also a preferred method of effecting precipitation of calcium carbonate, because a consequence of the use of organic amine or alkanolamine in step (a) is the option to recover excess carbon dioxide in step (d), which may readily be accomplished. It is understood that the carbon dioxide may be pure or preferably flue gas i.e. mixtures of $CO_2/N_2$ that has been cleaned, if necessary, or from a suitable source of carbon dioxide.

The precipitated calcium carbonate that is filtered from the solution is washed, to purify the calcium carbonate and wash off amine for recycling to the process. In preferred embodiments of the method, the calcium carbonate that is obtained is in the range of 97+% brightness.

The ratio of the salt of organic amine or alkanolamine, especially ethanolamine hydrochloride, to water, on a weight basis, is at least 1:1, especially in the range 1:1 to 1:3, although ratios with higher amounts of water may be used. Use of ratios in the range of 1:1 to 1:3 results in a significant decrease in the volume of the solution obtained on precipitation of the PCC, which must be processed for recovery of PCC. Ratios of 1:1 or close to that ratio are preferred, especially about 1:1.6. Use of ratios of less than 1:1 e.g. 1:0.7 can lead to gel formation, which is unacceptable and causes difficulties in processing. Increase in temperature also tends to reduce gel formation.

Heating of the solution containing PCC in the form of a suspension prior to recovery of the PCC may be used to effect a change in the crystal form of the PCC. For instance, heating of the solution to 80° C. tends to effect a change of the crystals to, or facilitate formation of, rhombohedral crystals or spherical calcite. Heating to 100° C. results in aragonite crystals. In addition to the effects on the type of crystal obtained, heating of the solution results in a decrease in solution viscosity. The heated solution is more readily filtered.

The solution containing PCC in the form of a suspension should be at a temperature of at least 50° C. and especially 50–80° C. prior to recovery of the PCC. Lower temperatures lead to gel formation.

It has been found that forming PCC at 95–100° C. in the absence of sodium hydrosulphite results in the formation of aragonite. Lower temperatures, especially in the range of about 80° C. up to about 95° C. results in the formation of the stable form of vaterite i.e. a spherical calcite, even in the absence of sodium hydrosulphite. However, as exemplified, at lower temperatures vaterite is formed and rapidly converted to, in particular, rhombohedral crystalline forms. Thus, the temperature of formation of the PCC has a significant effect on the type of crystals obtained in the absence of sodium hydrosulphite. Addition of sodium hydrosulphite results in stable vaterite i.e. spherical calcite.

The product obtained has a high brightness, as measured by the method of TAPPI T646 om-94. In preferred embodiments, the PCC has a brightness of at least 97%. In addition, the PCC obtained from the process is essentially free of grit and insolubles, in contrast to the conventional method of preparing PCC, and is therefore believed to be a PCC of high quality. The absence of grit means that the product can be used without being abrasive to calendering rolls in paper making processes.

It has also been found that under the conditions of preparation, only traces of magnesium carbonate are found in the resulting product, primarily because the magnesium tends not to dissolve in the slaking process and therefore is filtered out prior to carbonation.

The PCC obtained by the process of the present invention may be prepared in a variety of crystalline forms, depending on the temperature of crystallization, as is well known in the art. For example, at 10 to 15° C., the product is obtained as rhombohedral crystals, while at 35 to 40° C. vaterite crystals are obtained. This metastable form of calcium carbonate may be converted to aragonite crystals, which are obtained in the form of needles, by heating to about 95° C.

While processing with $CO_2$ in general tends to give coarse crystals, i.e. greater than 1 micron in size, mixing of solutions of ethanolamine carbonate with the reaction mixture can give gelatinous products which with stirring causes crystals to grow. After a period of time, which in embodiments and depending on the particular solution might be about 30 minutes, the crystals grow to an appropriate size, e.g. in the range of where the majority of the crystals are less than 1 micron.

Passing of carbon dioxide into the solution obtained with a 1:1 mixture tends to result in formation of a gel of PCC, which may be converted to a crystalline form. During such conversion, the particle size of the crystals may be controlled e.g. particle sizes in the range of 0.5 to 1 micron may be obtained.

Thus by varying the reaction conditions, temperatures and concentrations, it is possible to obtain PCC products in a wide range of particle sizes. This provides versatility to the process and extends the potential application of the invention.

Vaterite is known to be a metastable form of precipitated calcium carbonate. However, the crystals obtained according to the method of the present invention resembles vaterite when viewed under a microscope, but the crystals are stable. Such stability is exemplified below. Thus, in embodiments, the PCC that may be obtained according to the method of the present invention offers different characteristics compared to PCC in rhombohedral, scalenohedral or aragonite crystalline forms. A variety of uses are envisaged, including in paper-making processes. The process of the present invention does not result in formation of PCC in the scalenohedral crystalline form.

The present invention is illustrated by the following examples.

EXAMPLE I

In a comparative experiment, 100 grams of a sample of lime were slaked in 1000 ml of water, and the resultant suspension was passed through a 325 mesh screen to remove solid matter. The temperature of the resultant solution was raised to 40° C., and then carbon dioxide gas was passed through the solution.

The precipitated calcium carbonate that was obtained was examined by electron microscopy, and found to be scalenohedral crystals with a size of about 1 micron. The brightness was measured, using an elrepho brightness meter according to the method of TAPPI T646 om-94, and found to be 82.2.

As a further comparison, the procedure was repeated, with sodium hydrosulphite added to the solution at 40° C. prior to passing carbon dioxide through the solution. The brightness of the resultant precipitated calcium carbonate was found to be 91.4, but some formation of gel was noted.

EXAMPLE II

Ethanolamine chloride was prepared by mixing 2207 grams of ethanolamine with 3819 grams of concentrated hydrochloric acid, to give a 1:2 solution of ethanolamine hydrochloride in water, 1125 grams of the lime of Example 1 were added to the solution, which was then stirred for a period of one hour. The solution was brown in colour.

This solution was divided into two parts, and sodium hydrosulphite was added to one portion. Portions without sodium hydrosulphite were carbonated with $CO_2$ to make PCC, in the range of 50 to 70° C., giving four separate experiments. After the carbonation had reduced the pH to 6.35, samples were heated, with further $CO_2$, for instance for 1 hour at 50° C. and 70° C. for 5 minutes. In all cases the product was rhombohedral calcite, although scanning electron microscopy of the first-formed crystals, prior to the heating period, showed vaterite. The brightness was found to be 91.1. This material when treated with hydrosulphite gave a final brightness of 97.2 showing that postpreparation treatment to brighten the product could be done.

The same procedure was followed with other portions to which sodium hydrosulphite was added prior to carbonation. Any precipitate formed prior to carbonation was filtered. The mixture was carbonated, and in all cases no transformation of vaterite to rhombohedral calcite occurred. (see Example V below). The brightness on these samples was 97.6.

These examples showed that the hydrosulphite treated mixtures had a high brightness but were not transformable to rhombohedral calcite, whereas in the absence of hydrosulphite, low brightness was obtained but the transformation did occur.

These results indicate that the transformation of vaterite to rhombohedral calcite must be done prior to the addition of hydrosulphite and then the product is brightened with hydrosulphite.

EXAMPLE III

A sample of lime was slaked in a solution of ethanolamine chloride, and the resultant suspension was passed through a mesh screen to remove solid matter. The solution of ethanolamine chloride was prepared by mixing ethanolamine with concentrated hydrochloric acid, to give a 1:1.6 solution of ethanolamine hydrochloride in water. The resultant lime/ethanolamine chloride solution was treated with carbon dioxide to form precipitated calcium carbonate.

Samples of the solution containing the precipitated calcium carbonate were heated at temperatures from about 50° C–70° C. for various period of time, and then filtered. Examples of the heating included heating the solution for one hour at about 50° C. and at about 70° C. for 5 minutes. In all instances, the crystals obtained were rhombohedral calcite.

EXAMPLE IV

Precipitated calcium carbonate was formed using the method of Example III, except that the precipitated calcium carbonate was immediately filtered. A wet cake of vaterite was obtained.

The wet cake was heated at various temperatures for various periods of time. For instance, the cake was heated at about 50° C. for one hour and at about 70° C. for 5 minutes. In all instances, the vaterite was converted to rhombohedral calcite.

EXAMPLE V

The procedure of Example III was repeated except that the solution contained excess sodium hydrosulphite i.e. the amount of sodium hydrosulphite that had been added was in excess of the amount required to improve the colour of the slaked lime and the solution admixed with ethanolamine chloride contained sodium hydrosulphite.

It was found that the precipitated calcium carbonate that was obtained was vaterite. In addition, samples of the solution were heated as follows:

17° C. for 24 hours
50° C. for 1 hours
60° C. for 0.5 hours
70C for 15 minutes
80° C. for 8 minutes In all instances, the crystalline forms of the precipitated calcium carbonate remained as vaterite. Thus, no transformation of the vaterite into rhombohedral calcite or into any other form occurred on heating of the solutions.

This example shows that the method of the invention results in the formation of a stable form of vaterite, which is not converted to rhombohedral calcite as illustrated in Examples III and IV. It is therefore believed that a stable form of spherical calcite that resembles vaterite has been formed.

EXAMPLE VI

The procedure of Example III was repeated, except that the carbon dioxide was passed through the solution at 80° C. The precipitated calcium carbonate that was obtained was in the form of spherical crystals, i.e. vaterite. A portion of the solution containing the precipitate was held at a temperature of 80° C. for a further 30 minutes and no transformation of vaterite to rhombohedral calcite occurred, indicating that spherical calcite had been obtained without the use of hydrosulphite to inhibit the transformation to rhombohedral calcite.

EXAMPLE VII

The procedure of Example III was repeated, using a temperature of 50° C. The precipitated calcium carbonate obtained was in form of vaterite. When the temperature of the solution was raised to 100° C., the vaterite was transformed to aragonite.

However, when the same procedure was carried out in the presence of sodium hydrosulphite prior to the raising of the temperature to 100° C., no transformation of the vaterite to aragonite occurred. These results indicate that the brightening reaction must be carried out after the transformation of the vaterite to aragonite, if the latter crystals are required.

EXAMPLE VIII

Using the procedure of Example III, a sample of the solution was subjected to carbon dioxide at 100° C. The precipitated calcium carbonate obtained was in the form of aragonite. However, when the procedure was repeated in the presence of sodium hydrosulphite, the precipitated calcium carbonate obtained was in the form of spherical calcite.

This example illustrates that the presence of sodium hydrosulphite inhibits the conversion to aragonite at 100° C.

We claim:

1. A method for the manufacture of precipitated calcium carbonate from impure calcium oxide, comprising:
   (a) admixing said impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid, said salt being used in at least the stoichiometric amount to dissolve the calcium oxide;
   (b) separating the solution so obtained from insoluble matter therein; and
   (c) treating the solution at a temperature of at least 50° C. with (i) carbon dioxide or (ii) the carbonate of said amine or alkanolamine of step (a),
   said process additionally comprising the step of adding a solution of a reducing agent subsequent to step (b).

2. The method of claim 1 in which the reducing agent is sodium hydrosulphite.

3. The method of claim 1 in which the reducing agent is sodium sulphite.

4. The method of claim 2 in which the reducing agent is added subsequent to step (b) but prior to step (c).

5. The method of claim 2 in which the reducing agent is added subsequent to step (c).

6. The method of claim 2 in which the reducing agent is added in an amount effective to reduce the colour of the solution of (a).

7. The method of claim 1 in which the reducing agent is sodium hydrosulphite, which is added in an amount to effect a reduction in colour of the solution subjected to separation in step (b) and an improvement in the brightness of the PCC obtained in step (c).

8. The method of claim 7 in which the ratio of the salt of organic amine or alkanolamine to water, on a weight basis, is in the range of 1:1 to 1:3.

9. The method of claim 7 in which the temperature of the solutions is in the range of 50–80° C.

10. The method of claim 9 in which the method of the present invention provides precipitated calcium carbonate having a brightness of at least 95%.

11. The method of claim 10 in which the brightness is at least 97%.

12. The method of claim 9 in which the solution is treated, in step (c), with an alkanolamine carbonate.

13. The method of claim 9 in which the solution is treated, in step (c), with an amine carbonate.

14. The method of claim 9 in which the solution is treated, in step (c), with carbon dioxide.

15. The method of claim 9 in which the organic amine is ethanolamine.

16. The method of claim 1 in which the solution is admixed subsequent to step (b) with a solution of sodium hydrosulphite in an amount in excess of the amount required to reduce the colour.

17. The method of claim 1 in which the temperature of the solution in step (a) is at least 50° C.

18. The method of claim 1 in which a spherical calcite is obtained which is stable when heated in water at 80° C. for one hour.

19. Calcium carbonate formed by direct precipitation at a temperature of at least 50° C., said precipitated calcium carbonate being spherical calcite and being stable when heated in aqueous solution at 80° C. for one hour.

20. The calcium carbonate of claim 19 in which the calcium carbonate is formed in the presence of sodium hydrosulphite.

21. A method of forming precipitated calcium carbonate by carbonation of slaked lime at 50–100° C. in the presence of 1–5% by weight, based on the weight of calcium carbonate, of sodium hydrosulphite or sodium sulphite.

22. The method of claim 21 in which spherical calcite is formed.

23. The method of claim 22 in which the carbonation is carried out in the presence of ethanolamine chloride.

24. A method of forming precipitated calcium carbonate by carbonation of slaked lime at a temperature of at least 80° C. in the absence of excess sodium hydrosulphite.

25. The method of claim 24 in which a spherical calcite is obtained, the spherical calcite being stable when heated at 80° C. for one hour.

26. The method of claim 24 in which aragonite is formed when the temperature is raised to 95–100° C.

27. The method of claim 26 in which the temperature is 95–100° C.

28. Precipitated calcium carbonate that is resistant to transformation to rhombohedral calcite or to aragonite when precipitated in the presence of sodium hydrosulphite or sodium sulphite at a temperature of at least 50° C. or precipitated at a temperature of at least 80° C.

29. The method of claim 1 in which the reducing agent is added prior to step (c).

30. The method of claim 1 in which the reducing agent is added subsequent to step (c).

31. The method of claim 29 in which the solution is filtered subsequent to addition of reducing agent and prior to step (c).

32. The method of claim 1 in which the amount of reducing agent is 1–5% by weight of precipitated calcium carbonate.

* * * * *